(12) United States Patent
Dickow et al.

(10) Patent No.: US 9,459,340 B2
(45) Date of Patent: Oct. 4, 2016

(54) METHOD AND SYSTEM FOR A HEAD UNIT APPLICATION HOST FOR A RADAR DETECTOR

(71) Applicant: Ford Global Technologies, LLC, Dearborn, MI (US)

(72) Inventors: Justin Dickow, Royal Oak, MI (US); Joey Ray Grover, Madison Heights, MI (US); Scott Smereka, Warren, MI (US); Jacob Sigal, Ferndale, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 134 days.

(21) Appl. No.: 14/148,392

(22) Filed: Jan. 6, 2014

(65) Prior Publication Data

US 2015/0192660 A1 Jul. 9, 2015

(51) Int. Cl.

| G08G 1/00 | (2006.01) |
|---|---|
| G01S 7/00 | (2006.01) |
| G08G 1/052 | (2006.01) |
| G08G 1/0967 | (2006.01) |
| G01S 13/92 | (2006.01) |
| B60W 50/14 | (2012.01) |
| G01S 7/02 | (2006.01) |

(52) U.S. Cl.
CPC .............. *G01S 7/003* (2013.01); *B60W 50/14* (2013.01); *G01S 7/022* (2013.01); *G01S 13/92* (2013.01); *G08G 1/052* (2013.01); *G08G 1/096716* (2013.01); *G08G 1/096758* (2013.01); *G08G 1/096783* (2013.01); *G08G 1/096791* (2013.01); *B60W 2050/146* (2013.01)

(58) Field of Classification Search
CPC ....... G01S 7/003; G01S 13/92; G08G 1/052; G08G 1/096716; B60W 50/14; B60W 2050/146
USPC .......... 340/902, 905, 438, 441; 342/20, 385; 701/441
See application file for complete search history.

(56) References Cited

U.S. PATENT DOCUMENTS

| 5,146,226 | A | * | 9/1992 | Valentine | .................. G01S 3/18 342/20 |
|---|---|---|---|---|---|
| 6,094,148 | A | * | 7/2000 | Henry | .................. G08G 1/0965 340/902 |
| 6,118,403 | A | * | 9/2000 | Lang | ........................ 342/357.31 |
| 6,549,145 | B2 | * | 4/2003 | Hsu | .......................... B60Q 1/52 340/438 |
| 7,804,440 | B1 | * | 9/2010 | Orr | ........................ G01S 7/022 342/104 |
| 8,373,588 | B2 | | 2/2013 | Kuhn | |
| 8,520,069 | B2 | | 8/2013 | Haler | |
| 9,007,255 | B2 | * | 4/2015 | Jarvis | ...................... G01S 11/06 342/182 |

(Continued)

OTHER PUBLICATIONS iRadar S120R User guide, pp. 1-2.

*Primary Examiner* — Tai Nguyen
(74) *Attorney, Agent, or Firm* — Jennifer M. Stec; Brooks Kushman P.C.

(57) ABSTRACT

A vehicle computer system comprises one or more transceivers in communication with a radar-detector and an off-board server. The vehicle computer system further comprises a processor in the vehicle computer system in communication with the one or more transceivers. The processor is configured to receive a message from the radar-detector that includes information related to an alert, send data to the off-board server utilizing the one or more transceivers, the data including information related to the alert, and output at the VCS a notification based upon the message received from the radar-detector.

17 Claims, 4 Drawing Sheets

(56) References Cited

U.S. PATENT DOCUMENTS

| | | | |
|---|---|---|---|
| 2003/0011470 A1* | 1/2003 | Cohen | 340/425.5 |
| 2010/0188265 A1* | 7/2010 | Hill et al. | 340/905 |
| 2010/0214148 A1 | 8/2010 | Kuhn | |
| 2010/0214149 A1* | 8/2010 | Kuhn | 342/20 |
| 2012/0268306 A1* | 10/2012 | Coburn et al. | 342/20 |
| 2013/0009760 A1 | 1/2013 | Washlow et al. | |
| 2013/0147651 A1 | 6/2013 | Kuhn | |
| 2013/0211707 A1 | 8/2013 | Washlow et al. | |
| 2013/0214939 A1* | 8/2013 | Washlow et al. | 340/901 |
| 2013/0245941 A1 | 9/2013 | Stahlin et al. | |
| 2014/0225764 A1* | 8/2014 | Jarvis | 342/118 |

* cited by examiner

METHOD AND SYSTEM FOR A HEAD UNIT APPLICATION HOST FOR A RADAR DETECTOR

TECHNICAL FIELD

The present disclosure generally relates to vehicle infotainment systems, and more particularly, to systems and methods using applications on mobile devices, including a radar detector, in infotainment systems.

BACKGROUND

U.S. Pat. No. 8,373,588 generally discloses wireless and other external connectivity technology used in various ways to enhance or improve upon existing radar detector and police activity detection systems. External memory interfaces, such as SD cards or USB, provide external storage. Wireless interfaces such as Bluetooth, Zigbee, 802.11, and wireless personal area network communication protocols, allow a detector processor to interact wirelessly with external devices, such as a Bluetooth headset, a cellular network device providing a server connection, or toggle buttons used to indicate the presence of police activity at a current position. Further, radar detectors are upgraded to provide GPS capabilities, using the existing power/data connector of the radar detector.

U.S. Patent Application 2013/0211707 generally discloses an electromagnetic signal detector that interfaces with a mobile communication device that includes a communication element. The communication element transmits data between the electromagnetic signal detector and the mobile communication device via a first communication standard. A user interface of the mobile communication device communicates the data to a user of the electromagnetic signal detector. The mobile communication device communicates with a communication network via a second communication standard. The first communication standard differs from the second communication standard.

SUMMARY

In a first illustrative embodiment, a vehicle computer system comprising at least one controller in communication with one or more transceivers, the one or more transceivers capable of communication with a radar-detector. The at least one controller configured to establish communication with the radar detector, receive a message from the radar-detector that includes information related to an alert from the radar-detector, output a notification utilizing the vehicle computer system based upon the message received from the radar-detector.

In a second illustrative embodiment, a vehicle computer system comprising one or more transceivers in communication with a radar-detector and an off-board server, and a processor in the vehicle computer system in communication with the one or more transceivers. The processor is configured to receive a message from the radar-detector that includes information related to an alert, send data to the off-board server utilizing the one or more transceivers, the data including information related to the alert, and output at the VCS a notification based upon the message received from the radar-detector.

In a third illustrative embodiment, a vehicle computer system comprising a transceiver in communication with a radar-detector and a processor in the VCS in communication with the transceiver. The processor is configured to receive inputs from an interface of the vehicle computer system defining a setting for the radar-detector, receive a message from the radar-detector that includes information related to an alert from the radar-detector, output a notification based upon the message received from the radar-detector and the setting.

DETAILED DESCRIPTION

Figure 1:
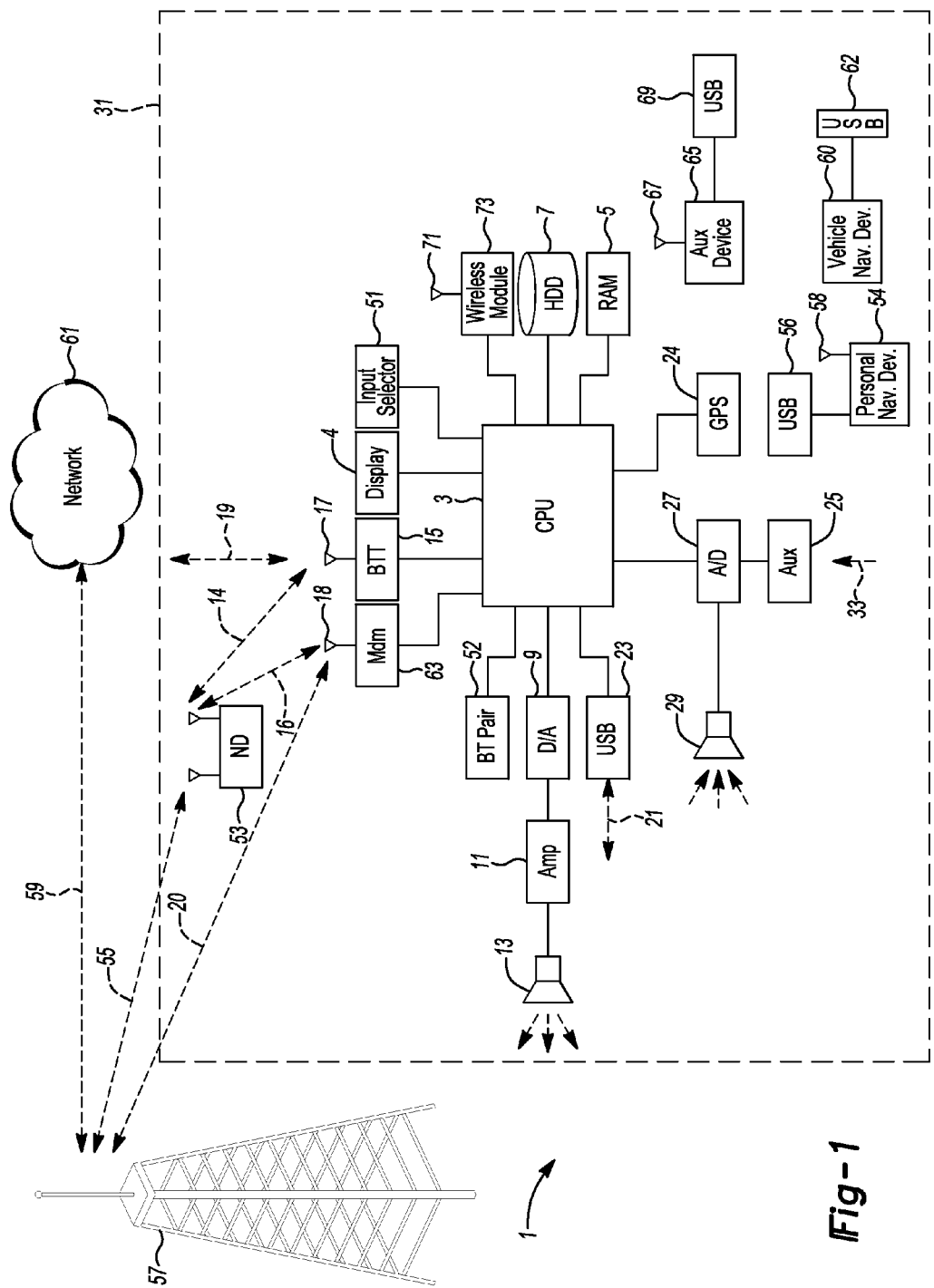
FIG. 1 is an exemplary block topology of a vehicle infotainment system implementing a user-interactive vehicle information display system according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EE- PROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

A vehicle may have a user interface system that may communicate with one or more nomadic devices. The user interface system may include, but is not limited to, a vehicle computing system, a display, and at least one connection apparatus to communicate with one or more nomadic devices. A user may interface with the one or more nomadic devices using the vehicle interface system. The one or more nomadic devices may contain several applications that may be compatible with the interface system for operation of a feature and/or function. The applications may be executed on the nomadic device, system, and/or a combination of both; and the output data may be presented to a user at the interface system.

The one or more nomadic devices communicating with the interface system may experience different management, output, and/or display of content based on the connected nomadic device operating host (e.g., Android, Windows, iOS, etc. . . . ). A user of the system may want a user interface paradigm that offers no discernible difference to the user between nomadic devices that are communicating to the system using different operating hosts.

The present disclosure provides a cohesive experience operating the interface system using one or more nomadic devices. No matter the operating system executing the feature/function on the nomadic device, the system may output content in a paradigm that offers no discernible difference to the user between applications that are running on different operating hosts. The operating host may include, but is not limited to, the nomadic device operating system, the vehicle computing system, and/or a remote server.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
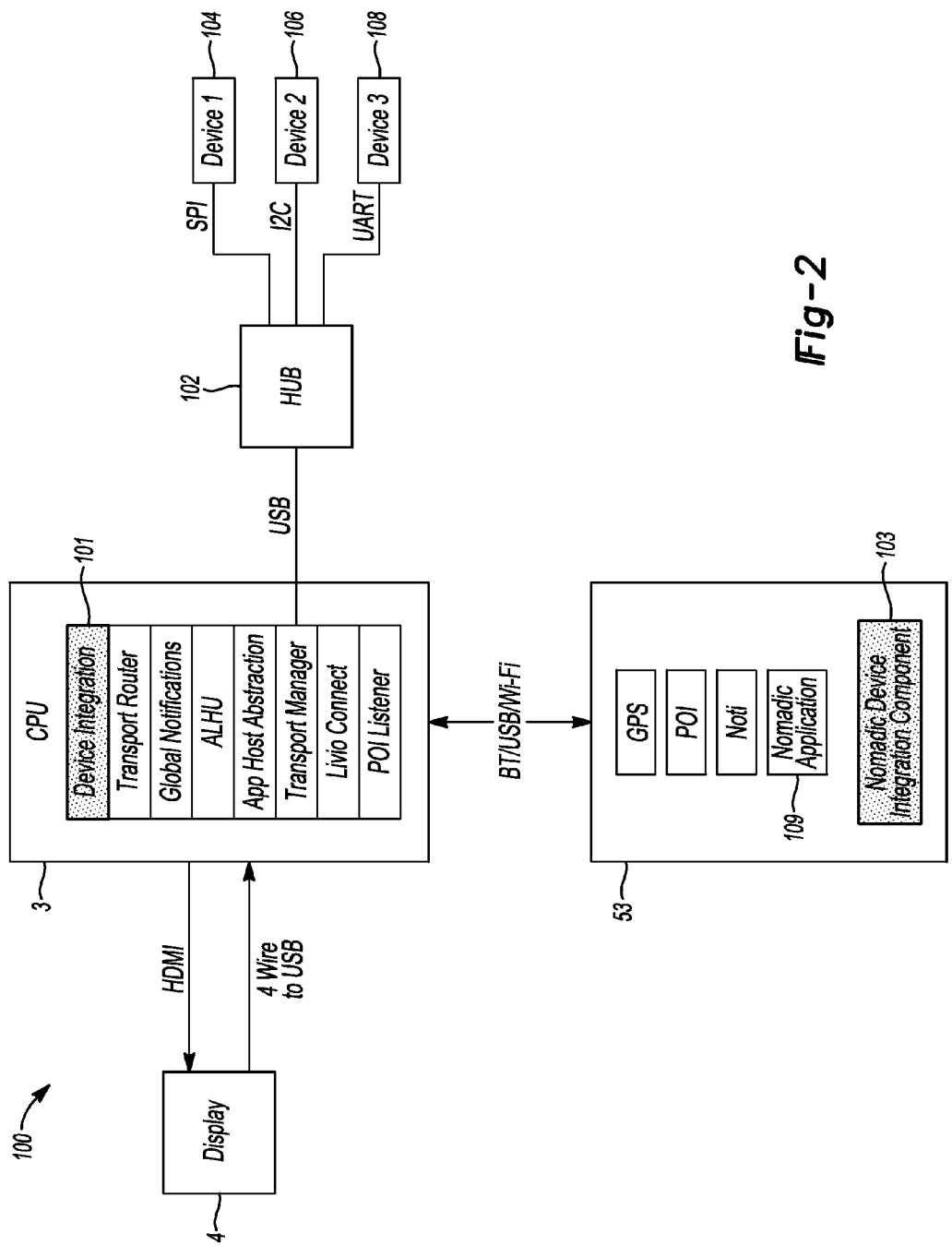
FIG. 2 is an exemplary block topology of a system for integrating one or more connected devices with the vehicle based computing system according to an embodiment.

FIG. 2 is an exemplary block topology of a system 100 for integrating one or more connected devices with the vehicle based computing system 1 (VCS). The CPU 3 may be in communication with one or more transceivers. The one or more transceivers are capable for wired and wireless communication for the integration of one or more devices. To facilitate the integration, the CPU 3 may include a device integration framework 101 configured to provide various services to the connected devices. These services may include transport routing of messages between the connected devices and the CPU 3, global notification services to allow connected devices to provide alerts to the user, application launch and management facilities to allow for unified access to applications executed by the CPU 3 and those executed by the connected devices, and point of interest location and management services for various possible vehicle 31 destinations.

As mentioned above, the CPU 3 of the VCS 1 may be configured to interface with one or more nomadic devices 53 of various types. The nomadic device 53 may further include a device integration client component 103 to allow the nomadic device 53 to take advantage of the services provided by the device integration framework 101.

The one or more transceivers may include a multiport connector hub 102. The multiport connector hub 102 may be used to interface between the CPU 3 and additional types of connected devices other than the nomadic devices 53. The multiport connector hub 102 may communicate with the CPU 3 over various buses and protocols, such as via USB, and may further communicate with the connected devices using various other connection buses and protocols, such as Serial Peripheral Interface Bus (SPI), Inter-integrated circuit (I2C), and/or Universal Asynchronous Receiver/Transmitter (UART). The multiport connector hub 102 may further perform communication protocol translation and interworking services between the protocols used by the connected devices and the protocol used between the multiport connector hub 102 and the CPU 3. The connected devices may include, as some non-limiting examples, a radar detector 104, a global position receiver device 106, and a storage device 108.

Figure 3:
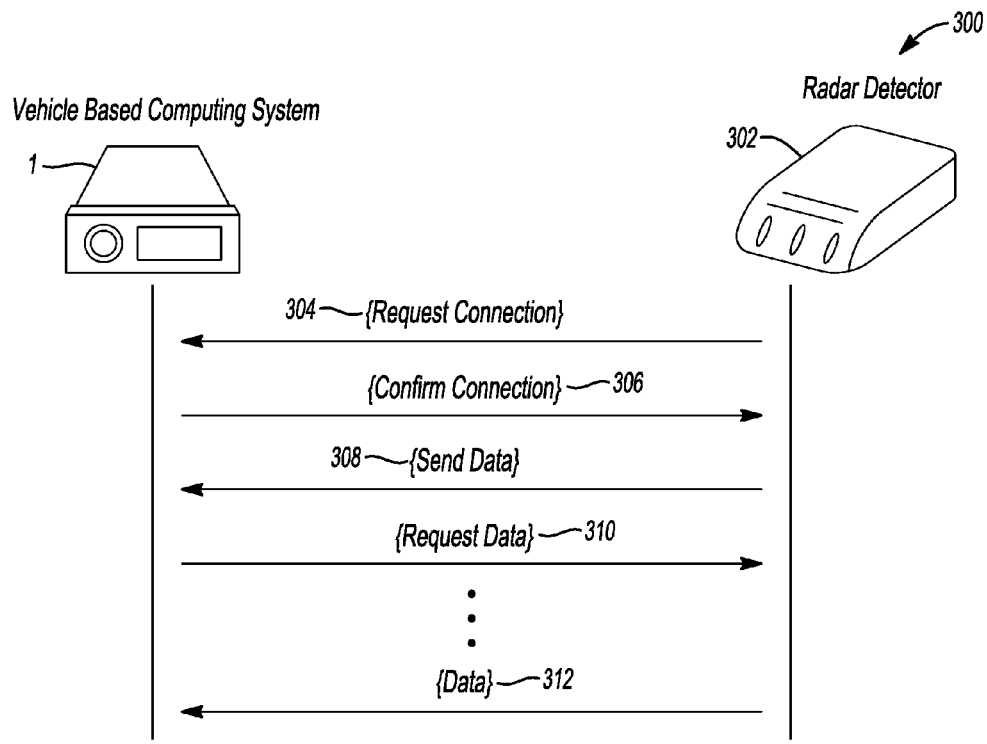
FIG. 3 is a block diagram illustrating a vehicle computing system in communication with a radar detector according to an embodiment.

FIG. 3 is a block diagram 300 illustrating the vehicle computing system 1 in communication with a radar detector 302 according to an embodiment. The VCS 1 may receive a request 304 from the radar detector to connect. The radar detector 302 may transmit an identification request once the VCS 1 is detected. The identification request may include, but is not limited to, requesting if the radar detector 302 is combatable with the VCS 1, and if the radar detector 302 has an application/service that may depend on the VCS 1.

The VCS 1 may respond to the identification and connection request and transmit an answer to the radar detector. The answer may include, but is not limited to, a message notifying the radar detector 302 is not compatible with the VCS 1, or a message notifying the radar detector 302 is compatible with the VCS 1 and what application(s) and/or services that may be enabled by the VCS 1. The VCS 1 may transmit a message confirming the connection 306 to the radar detector 302. Data 308 may be transmitted to the VCS 1 if the radar detector 302 is compatible with the VCS 1.

The data 308 transmitted to the VCS 1 may include information collected from the radar detector. For example, the information may include an alert detected from a nearby radar gun. Additionally, the frequency band, estimated distance, location, and source of the radar may also be sent to the VCS 1. The VCS 1 may utilize any data sent by the radar detector to notify a user of the detection. Additionally, the VCS may utilize the data for other applications or services, such as the navigation system.

Additionally, the VCS 1 may request data 310 from the radar detector 302. In one embodiment, a specific application or service running on the VCS may request data 310 from the radar detector 302 for utilization of a specific feature of that application or service. The radar-detector may respond by sending the requested data 312 to the VCS 1. In one exemplarity embodiment, a navigation application may request radar alert information to notify a user of where radar is detected on a map. If the data is available, the radar detector may send the requested data 312 to the VCS 1. The navigation application may utilize the data to show a pinpoint location of where the radar source is located with respect to the current vehicle position. If the radar detector does not have the data requested, the radar detector may send a message to the VCS 1 notifying that the data is currently not available. Thus, the application or service may understand that a specific feature may not be capable of being used.

Figure 4:
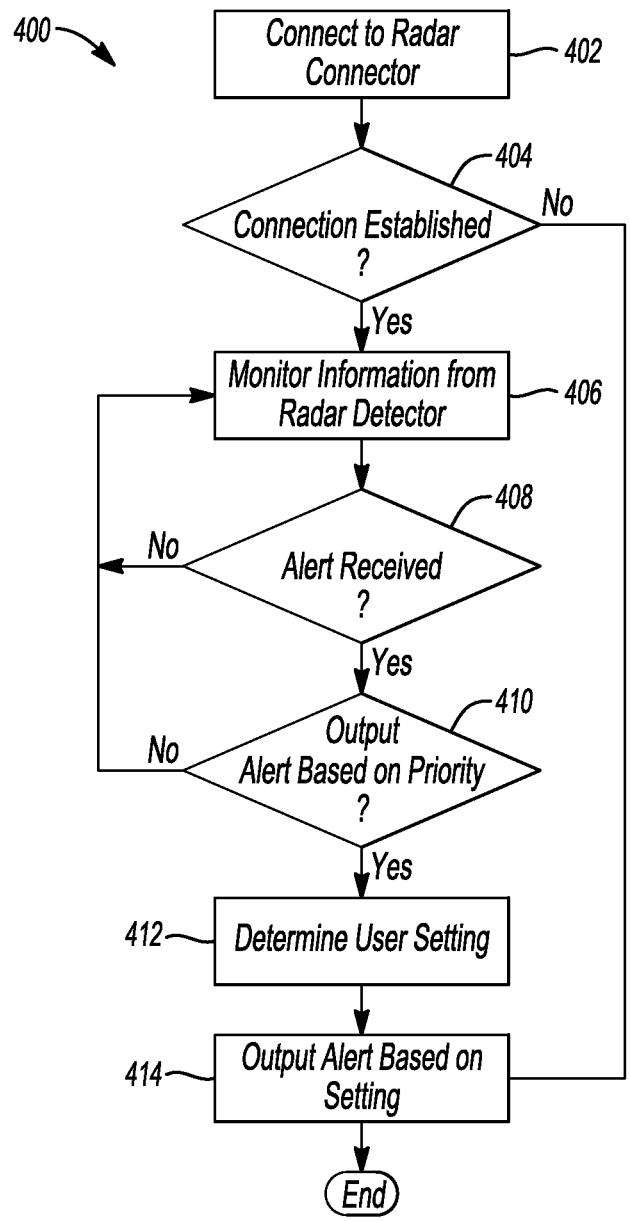
FIG. 4 is a flow chart illustrating an example method of a vehicle computing system communicating with a radar detector and outputting information pertaining to an alert from the radar detector.

FIG. 4 is a flow chart illustrating an example method of a vehicle computing system communicating with a radar detector and outputting information pertaining to an alert from the radar detector. The VCS may connect with a radar detector 402 to interact and communicate data and information amongst each other. For example, the VCS may be able to communicate with an Escort Radar 9500ix or another type of radar-detector or radar-detectors. The connection may include a wired or wireless connection.

Upon establishing a connection 404 with the radar detector, the VCS may monitor information received from the radar detector 406. For example, the radar detector may send information pertaining to a specific alert or radar signal that has been detected. In another example, the radar detector may ping the VCS to maintain a connection for communication. The radar detector may also send data or other information related to the alert. The VCS may utilize the data retrieved from the radar detector to output a notification via speakers or a multimedia system user interface screen. Additionally, other applications (e.g. navigation application) may utilize the data for various features.

Additionally, other information may be received from the radar detector, such as a request to utilize the VCS. For example, the radar-detector may send a request to output a sound or alert via the VCS. In another example, the VCS may have an application or service that requests information from the radar detector.

Upon the VCS receiving the alert or data 408, the VCS may then determine whether to utilize the data or output the alert. The VCS may analyze the priority of the message or alert that is received from the radar detector. If the priority is high for the alert or message, the VCS may notify a user of the information through the vehicle's user interface. The VCS may then determine whether the alert should be output to the user based on the priority of the alert 410 in view of currently running applications or services on the VCS. For example, if a hands-free phone call is taking place, a low priority message may simply be ignored. However, if the alert is high priority, the alert may be output to the user. Other applications or services that may require high priority for output as well. Additionally, the VCS may analyze the vehicle environment (e.g. speed of vehicle, current applications running, other forms of cognitive load for the user, etc.) to determine whether the alert is output. The priority of the radar detector's alerts is based on the recommended interpretation of the situation, which can change over a brief period of time depending on the detection. For example, a radar alert situation may be determined as the highest priority for a notification. Thus, the alert may be output over other notifications, warnings, or scenarios (e.g. hands-free phone call, navigation guidance, audio output or streaming, etc.). The radar detector may emit a short alert for a few seconds and then fall silent only to briefly alert and fall silent again. An instant on the radar source may be used ahead of the driver and out of view. Another situation which may generate a higher priority message is when the vehicle speed is over the above speed-limit (retrieved from off-board server or on-board map database) and a radar alert is notified.

Once the priority of the alert or message is calculated, the VCS may analyze the settings 412 of the radar detector and VCS to properly output the alert to the user based on the settings 414. Various settings may be customized by the user to define how the alert can be shown. The setting may be defined by a user interface on the VCS, such as a GUI on a vehicle display or a hard button interface. The settings may define both vehicle settings and/or radar-detector settings. The settings may be for the vehicle as pertaining to the radar-detector. The settings may determine when to ignore an alert. The settings may be available for a user to configure the notifications or alerts, as well as change any settings that can be changed by the hard keys on the radar device. For example, there may be an ON/OFF toggle for the following settings: auto sensitivity switch, traffic signal rejection, safety warning signal, and voice announcements. Additionally, the VCS may be able to cache information about police detections for additional features such as displaying statistics about police detections in the current area. For example, if a certain intersection, street, city, or zip code has a higher amount of detection in the area, alert information and data may be crowd sourced. The data may be sent to an off-board server to be gathered and collected. A server or another off-board platform may be able to push specific data to a user in response to the vehicle sending specific vehicle data to the server. For example, data may be sent to the vehicle from the server based on the vehicle's location that is calculated by the GPS data sent to the server. Thus, an alert may pop-up on the user interface letting a driver know that a specific area has a high amount of radar alerts in the area. In another non-limiting example, the data may be exchanged between the vehicle computer system and off-board server without the requirement of a radar-detector in the vehicle.

Figure 5:
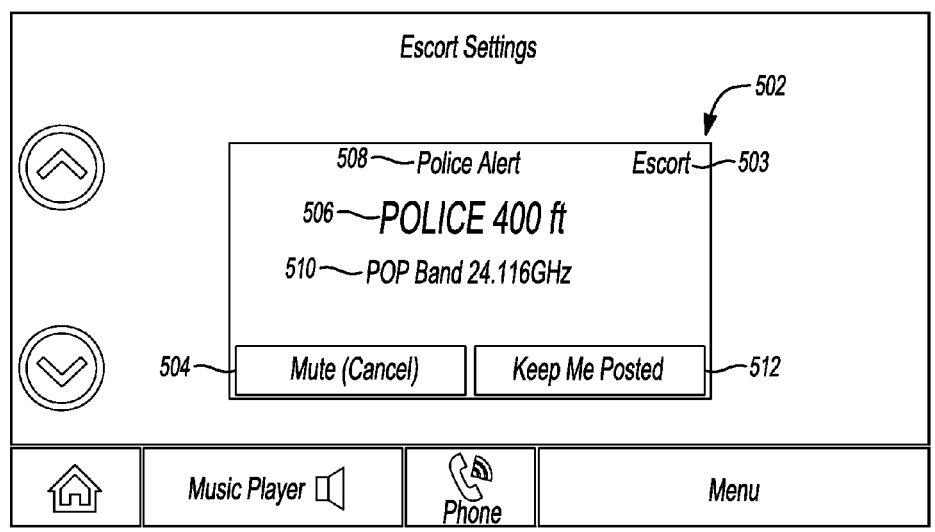
FIG. 5 is an exemplary screen shot of a vehicle infotainment system implementing a user interface of the radar detector interacting with the vehicle based computing system.

FIG. 5 is an exemplary screen shot of a vehicle infotainment system implementing a user interface of the radar detector interacting with the vehicle based computing system. Upon receiving an incoming message from the radar detector, the user interface of the VCS may display on a screen 500 alerting the user of the radar detector alert. The screen 500 may include a message 502 from the radar detector.

Many features of the radar detector may be implemented into the vehicle user interface. For example, the interface may enable a more advanced user interface and feature set than typically associated with a stand-alone radar detector. Some features that may be supported is the ability to power the radar detector on and off from the user interface. The interface may also allow the user to mark the location of a specific point where a radar alert/notification is output. The user interface may include a manual switch between highway, auto, and auto NoX. The user interface may allow the user to select a button to mute/unmute 504 any alerts. The user interface may allow the vehicle infotainment system to adjust the volume of the alert notifications. Additionally the user may be able to lockout or unlock an alert or specific type of alert.

The radar application may include a feature for automatic radar sensitivity. Each radar detector may have different settings for automatic radar sensitivity. In one non-limiting embodiment, the VCS may automatically switch the radar between highway, auto, and auto NoX sensitive if the users elect to do so. This may affect the sensitivity as full sensitivity, filtered, and filtered without X-Band, respectfully. The radar application may interact with the VCS navigation application (e.g. map database) to determine what type of functional class road the vehicle is on. Additionally, the radar application may utilize the vehicle speed sensor as well for the radar sensitivity feature. Thus for certain vehicle functions, such as cruise control, adaptive cruise control, collision avoidance, etc, the data sent from the radar-detector may be utilized to decrease the speed of the vehicle. Additionally, the vehicle data associated with various vehicle functions may be sent to the off-board server for use in conjunction with other applications.

The radar detection metrics may also include a service that is enabled by the radar application to turn on a unique feature of the radar detector. For example, the Escort Radar 9500ix may include a feature to turn on a mode called "ExpertMeter" that can be activated by the VCS display. In another example, the VCS may be able to activate a unique feature called "SpecDisplay" to report the frequency numerically features of the radar to be turned on if they are not already on. The application may then continuously capture up various signals, their frequency, and their associated strengths. This may enable the application to display the radar detections and signal strengths as they change over time.

An API may be used with other applications or services to interact with the radar detector. For example, the API may retrieve GPS signal strength form the other applications, including the navigation application. It may also retrieve recent detections of the current area to notify other applications, such as the navigation application.

The radar detector message 502 may include information to notify the user of a nearby radar signal or alert. For example, the message 502 may include information from the type of radar detector it is coming from. For example, if the name or manufacturer of the detector is the Escort Radar 9500ix, a device identifier 503 that states "Escort" may show up. The device identifier may identify the device by name, manufacturer, model number, etc. Additionally, the type of alert 508 may be shown. For example, if the alert is from police radar, the message may state that the alert is a "Police Alert." Of course, other types of alerts may exist, such as a police alert, non-police alert, door openers, false alarms, etc. Additionally, the alert notifications may include notifications of the band frequency of the alert 510 that may be from the X-Band, K-Band, Ka-Band, POP, Laser, and Safety warning signal. The frequency 510 may also be displayed. The notification may also include the current vehicle speed upon the Laser, Radar, or Pop detection. The VCS may receive the vehicle speed from the vehicle speed sensor or utilize GPS speed. Additionally, information regarding the vicinity and source of the signal 506 (e.g. "Police 400 ft") may displayed on the alert notification. A user may elect to continue to receive alert notifications 512 by a user interface button.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle computer system (VCS) located in a vehicle, comprising:
    at least one controller in communication with one or more wireless transceivers, the one or more wireless transceivers configured to communicate with a radar detector configured to detect signals from a radar gun, the at least one controller configured to:
    establish communication with the radar detector;
    receive a message from the radar-detector that includes information related to an alert from the radar detector and a priority utilized to determine whether to output a notification over an in-vehicle communication using the priority;
    output a notification in the vehicle utilizing the VCS based upon the message received from the radar detector and the priority.

2. The vehicle computer system of claim 1, wherein the notification is output via a user interface of the VCS.

3. The vehicle computer system of claim 1, wherein the notification is output via one or more vehicle speakers of the VCS.

4. The vehicle computer system of claim 1, wherein the notification includes a manual switch between various modes of the radar detector.

5. The vehicle computer system of claim 1, wherein the controller is further configured to automatically switch the radar detector between various modes.

6. The vehicle computer system of claim 1, wherein the notification includes a message priority, wherein the message-priority is utilized to determine if the notification is output or ignored.

7. The vehicle computer system of claim 1, wherein the controller is further configured to send a request to the radar detector to change a setting of the radar detector based upon a selection from a user interface of the VCS.

8. The vehicle computer system of claim 1, wherein the controller is further configured to mark an alert location on a navigation map of the VCS.

9. The vehicle computer system of claim 1, wherein the controller is further configured to send the message from the radar detector to an off-board server.

10. A vehicle computer system (VCS), located in a vehicle comprising:
    one or more wireless transceivers in communication with a radar detector configured to detect signals from a radar gun, an off-board server, and a mobile device;
    a processor in the VCS in communication with the one or more transceivers, the processor configured to:
        receive a message from the radar detector that includes information related to an alert and a priority utilized to determine whether to output a notification over an in-vehicle communication using the priority;
        output multimedia information from the VCS;
        send data to the off-board server utilizing the one or more transceivers, the data including information related to the alert;
        determine whether to output at the VCS a radar notification based upon the message received from the radar detector, the priority, and the multimedia information,
        output the radar notification at the VCS based upon the determination.

11. The vehicle computer system of claim 10, wherein the processor is further configured to output the notification based upon a setting of the radar detector.

12. The vehicle computer system of claim 11, wherein the setting of the radar detector is set via a user interface of the VCS.

13. The vehicle computer system of claim 10, wherein the processor is further configured to receive data from the off-board server utilizing the one or more transceivers.

14. The vehicle computer system of claim 13, wherein the data received from the off-board server is utilized in an application of the VCS.

15. A vehicle computer system (VCS) comprising:
    a wireless transceiver in communication with a radar detector configured to detect signals from a radar gun;
    a processor in the VCS configured to:
        receive a message from the radar detector that includes information related to an alert from the radar detector and a priority utilized to determine whether to output the message over an in-vehicle communication;
        output a notification based upon the message and the priority.

16. The vehicle computer system of claim 15, wherein the in-vehicle communication is a hands-free phone call, a guidance instruction from the VCS, or audio output from the VCS.

17. The vehicle computer system of claim 15, wherein settings of the radar detector are implemented into a user interface of the VCS.

* * * * *